US006577939B1

United States Patent
Keyse et al.

(10) Patent No.: US 6,577,939 B1
(45) Date of Patent: Jun. 10, 2003

(54) PRESSURE CONTROL SYSTEM AND CONTROL METHOD FOR A MULTIPLE-RATIO TRANSMISSION WITH PRE-STAGED RATIO SHIFTS

(75) Inventors: Brian Keyse, Redford, MI (US); Ihab S. Soliman, Dearborn, MI (US); Jeremy L. Russell, Livonia, MI (US); Kevin MacFarlane, Northville, MI (US); Stephen Michael Cicala, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,855

(22) Filed: May 20, 2002

(51) Int. Cl.[7] ............................ F16H 61/04; G06F 7/00
(52) U.S. Cl. ............................ 701/55; 701/56; 477/34; 477/50
(58) Field of Search .................. 701/51, 53–56, 701/61, 36; 477/34, 50

(56) References Cited

U.S. PATENT DOCUMENTS 4,611,285 A * 9/1986 Weisman, II ................. 701/60

| 6,122,583 | A | 9/2000 | Kirchhoffer et al. |
| 6,299,565 | B1 | 10/2001 | Jain et al. |
| 6,301,538 | B1 | 10/2001 | Kirchhoffer et al. |

FOREIGN PATENT DOCUMENTS

| DE | 196 10 600 A1 | * 9/1996 | ........... F16H/61/06 |
| JP | 402304262 A | * 12/1990 | ........... F16H/61/16 |
| JP | 409280361 A | * 10/1997 | ........... F16H/61/06 |

* cited by examiner

Primary Examiner—Yonel Beaulieu
(74) Attorney, Agent, or Firm—F. G. McKenzie

(57) ABSTRACT

A modular electronic control system for a geared multiple-ratio transmission wherein pressure profiles for each ratio shift actuator are used to provide seamless transitions during both positive and negative engine torque conditions to improve shift feel and responsiveness to ratio change commands. The system provides shift staging for sequenced shifts between ratios as well as for so-called "change-of-mind" shifts in which a sequence shift is interrupted as a new destination gear is introduced. A constant ratio change occurs during sequenced shifts. A change-of-mind shift can be performed directly where the new destination gear is commanded immediately. Independent pressure profiles for each clutch involved in a commanded shift are used to accommodate various types of shifts.

25 Claims, 18 Drawing Sheets

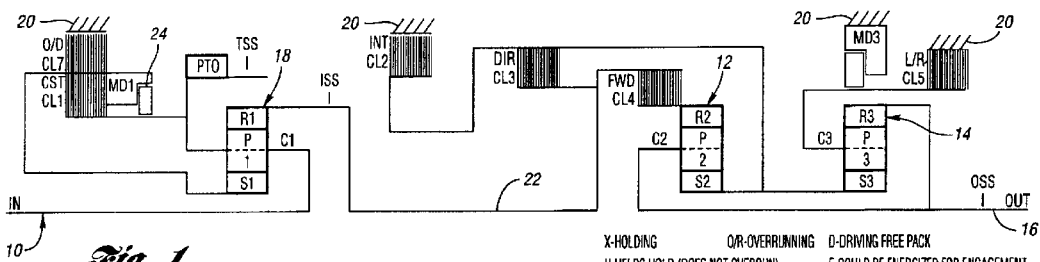

Fig. 3

| | | PTO | R1 | S1 | C1 | P1 | R2 | S2 | C2 | P2 | R3 | S3 | C3 | P3 | OUT | CST CL1 | INT CL2 | DIR CL3 | FWD CL4 | L/R CL5 | CONV CL6 | O/D CL7 | MD1 | MD3 |
|---|---|---|---|---|---|---|---|---|---|---|---|---|---|---|---|---|---|---|---|---|---|---|---|---|
| S P E E D | 1M | 1.000 | 1.000 | 1.000 | 1.000 | | 1.000 | -0.933 | 0.324 | 2.931 | 0.324 | -0.933 | | 0.991 | 0.324 | | | -0.933 | 1.933 | | - | 1.000 | | |
| | 1A | 1.000 | 1.000 | 1.000 | 1.000 | | 1.000 | -0.933 | 0.324 | 2.931 | 0.324 | -0.933 | | 0.991 | 0.324 | | | -0.933 | 1.933 | | - | 1.000 | | |
| | 2M | 1.000 | 1.404 | | 1.000 | 1.357 | 1.404 | -1.310 | 0.454 | 4.116 | 0.454 | -1.310 | | 1.392 | 0.454 | 1.000 | | -1.310 | 2.714 | | - | | 1.000 | |
| | 2A | 1.000 | 1.404 | | 1.000 | 1.357 | 1.404 | -1.310 | 0.454 | 4.116 | 0.454 | -1.310 | | 1.392 | 0.454 | 1.000 | | -1.310 | 2.714 | | - | | 1.000 | |
| | 3M | 1.000 | 1.000 | 1.000 | 1.000 | | 1.000 | | 0.650 | 1.517 | 0.650 | | 0.483 | 1.513 | 0.650 | | | | 1.000 | 0.483 | - | 1.000 | | 0.483 |
| | 3A | 1.000 | 1.000 | 1.000 | 1.000 | | 1.000 | | 0.650 | 1.517 | 0.650 | | 0.483 | 0.513 | 0.650 | | | | 1.000 | 0.483 | - | 1.000 | | 0.483 |
| | 4A | 1.000 | 1.404 | | 1.000 | 1.357 | 1.404 | | 0.913 | 2.130 | 0.913 | | 0.678 | 0.720 | 0.913 | | | | 1.404 | 0.678 | - | | 1.000 | 0.678 |
| | 5M | 1.000 | 1.000 | 1.000 | 1.000 | | 1.000 | 1.000 | 1.000 | | 1.000 | 1.000 | 1.000 | | 1.000 | | 1.000 | | | 1.000 | - | 1.000 | | 1.000 |
| | 5A | 1.000 | 1.000 | 1.000 | 1.000 | | 1.000 | 1.000 | 1.000 | | 1.000 | 1.000 | 1.000 | | 1.000 | | 1.000 | | | 1.000 | - | 1.000 | | 1.000 |
| | 6A | 1.000 | 1.404 | | 1.000 | 1.357 | 1.404 | 1.404 | 1.404 | | 1.404 | 1.404 | 1.404 | | 1.404 | 1.000 | 1.404 | | | 1.404 | - | | 1.000 | 1.404 |
| | R | 1.000 | 1.000 | 1.000 | 1.000 | | -1.072 | 1.000 | -0.347 | -3.143 | -0.347 | 1.000 | | -1.063 | -0.347 | | | 1.000 | | 2.072 | - | 1.000 | | |
| | PTO | 1.000 | 1.000 | 1.000 | 1.000 | | | | | | | | | | | | | | 1.000 | 1.000 | | | | | |
| T O R Q U E | 1M | | 1.000 | 0.404 | 1.404 | | 1.000 | -0.538 | 1.538 | | 1.552 | -0.538 | 2.090 | | 3.090 | 0.404 | | | 1.000 | 2.090 | - | | 0.404 | 2.090 |
| | 1A | | 1.000 | 0.404 | 1.404 | | 1.000 | -0.538 | 1.538 | | 1.552 | -0.538 | 2.090 | | 3.090 | | | | 1.000 | 2.090 | - | | 0.404 | 2.090 |
| | 2M | | 0.712 | 0.288 | 1.000 | | 0.712 | -0.383 | 1.096 | | 1.105 | -0.383 | 1.489 | | 2.201 | | | | 0.712 | 1.489 | - | 0.288 | | 1.489 |
| | 2A | | 0.712 | 0.288 | 1.000 | | 0.712 | -0.383 | 1.096 | | 1.105 | -0.383 | 1.489 | | 2.201 | | | | 0.712 | 1.489 | - | 0.288 | | 1.489 |
| | 3M | | 1.000 | 0.404 | 1.404 | | 1.000 | -0.538 | 1.538 | | | | | | 1.538 | 0.404 | -0.538 | 1.000 | | | - | | 0.404 | |
| | 3A | | 1.000 | 0.404 | 1.404 | | 1.000 | -0538 | 1.538 | | | | | | 1.538 | | -0.538 | 1.000 | | | - | | 0.404 | |
| | 4A | | 0.712 | 0.288 | 1.000 | | 0.712 | -0.383 | 1.096 | | | | | | 1.096 | | -0.383 | 0.712 | | | - | 0.288 | | |
| | 5M | | 1.000 | 0.404 | 1.404 | | 0.650 | 0.350 | 1.000 | | | | | | 1.000 | 0.404 | | 0.350 | 0.650 | | - | | 0.404 | |
| | 5A | | 1.000 | 0.404 | 1.404 | | 0.650 | 0.350 | 1.000 | | | | | | 1.000 | | | 0.350 | 0.650 | | - | | 0.404 | |
| | 6A | | 0.712 | 0.288 | 1.000 | | 0.463 | 0.249 | 0.712 | | | | | | 0.712 | | | 0.249 | 0.463 | | - | 0.288 | | |
| | R | | 1.000 | 0.404 | 1.404 | | | | | | -2.882 | 1.000 | -3.882 | | -2.882 | 0.404 | | 1.000 | | -3.882 | - | | 0.404 | -3.882 |
| | PTO* | 1.000 | | 0.404 | 1.000 | | | | | | | | | | | | | | | | | | 0.404 | | |

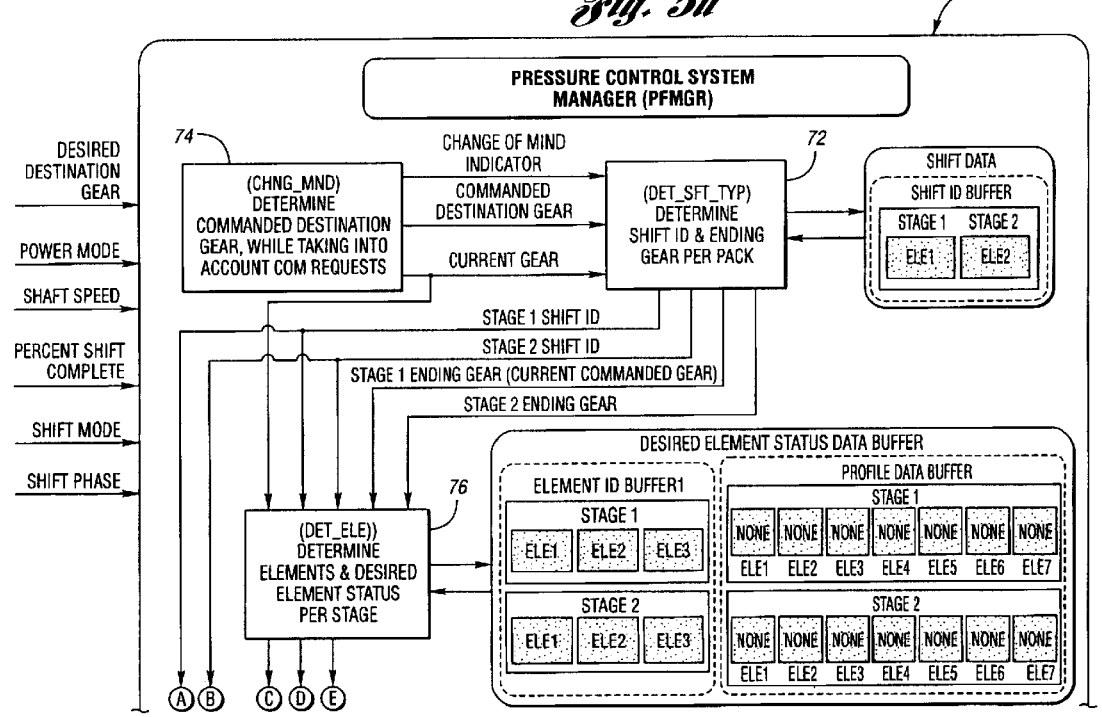

PRESSURE CONTROL SYSTEM AND CONTROL METHOD FOR A MULTIPLE-RATIO TRANSMISSION WITH PRE-STAGED RATIO SHIFTS

BACKGROUND OF INVENTION

1. Field of the Invention

The invention relates to controls for multiple-ratio, geared transmissions, particularly for automotive vehicles, to effect a smooth transition between ratios during a shift sequence.

2. Background Art

A conventional multiple-ratio automatic transmission for automotive vehicles typically includes a hydrokinetic torque converter located between the crankshaft of an internal combustion engine and the multiple-ratio gearing. The gearing establishes multiple torque flow paths to the vehicle traction wheels. The ratio changes that occur may be accomplished by simultaneously engaging a drive clutch and disengaging a reaction brake, the reaction brake establishing a reaction point for the gearing. Such a shift is referred to as a synchronous shift. A non-synchronous shift may include an overrunning coupling for establishing a reaction point for the gearing during torque transfer and a separate coupling for clutching together two elements of the planetary gearing. An example of a transmission of this kind may be seen by referring to U.S. Pat. No. 6,122,583, which is assigned to the assignee of the present invention.

It is known also in the automotive transmission art to provide geared multiple-ratio transmissions in a torque delivery driveline wherein a "swap shift" ratio change sequence can be achieved as a reaction brake for one reaction gear is applied and an independent brake for a second gear is released. An example of a transmission having a "swap shift" feature may be seen by referring to U.S. Pat. No. 6,301,538. This patent also is assigned to the assignee of the present invention.

Ratio changes are controlled by an electronic microprocessor that develops control signals in response to changes in operating variables of the powertrain to actuate shift solenoids, which, in turn, control shift valves for actuating and releasing clutch and brake actuators.

SUMMARY OF INVENTION

The present invention comprises a pressure control system and control method for an automatic transmission wherein control elements for the transmission clutches and brakes are controlled independently by controlling pressure profiles for each clutch or brake element. A seamless transition between ratios is provided by pre-staging shifts during a ratio change sequence.

The system architecture, which is in modular form, incorporates several control features of conventional transmissions. It is configured, however, to achieve a shift sequence in which the destination gear is obtained as quickly as possible, both during a regular ratio change sequence and during a so-called change-of-mind sequence where a new destination gear is commanded before the completion of a previously commanded destination gear. The overall system response is improved because of this pre-staging capability of looking ahead for pending shifts. This permits the controller to prepare in advance the clutch or brake actuators to be used during the shift sequence.

During a shift sequence, the current shift is performed during a so-called stage 1 shift. A pending shift, which is referred to in this disclosure as a stage 2 shift, is prepared during the progress of the stage 1 shift. The stage 2 shift is transformed into stage 1 when the current stage 1 shift is completed. Any new shift in the shift sequence needed to achieve the final destination gear is loaded into stage 2. At this point, shifts will continue to be transposed or rolled over from stage 2 to stage 1 as they are completed until the final destination gear is achieved.

The pre-staging of the ratio changes during a shift sequence reduces delays caused by the hydraulics and the electronics of the control system. The controller includes a modular library of shifting and pre-staging pressure profiles. On startup, the strategy detects the current gear ratio to initialize the system into a proper gear after the transmission is powered up.

A change-of-mind shift, in which the destination gear is in the opposite direction from the current shift, causes the current shift to be interrupted as the system returns to the starting gear while pre-staging elements needed for the final desired gear. For a change-of-mind situation in which a shift to a destination gear is in the same direction as the current shift, the strategy will continue with the current shift while pre-staging elements needed for a final desired gear.

The invention includes a first system and method step for processing changes in the desired destination gear ratio to identify active friction elements and time the start and completion of each ratio change.

A second subsystem and method step specifies the pressure control action required to apply or release a friction element during a ratio change and during a friction element engagement. The second subsystem has a library of pressure profiles required to complete all ratio changes and engagements.

A third subsystem and method step involves storing a collection of pressure calculations and algorithms accessible by the first and second subsystems and method steps for calculating an appropriate pressure for each friction element.

The first and second subsystems interface with the third subsystem and with each other. The first and second subsystems use calculations in the third subsystem to monitor the status of a ratio change and to calculate the appropriate output pressure for each friction element.

Each subsystem may be a separate module that is independently configured whereby the control system is adaptable by calibration for use with a variety of transmission mechanisms with discrete pressure actuated friction elements and for specifying pressure profiles, friction element actuation and gear ratio sequencing.

The first subsystem has buffer portions that receive desired friction element data for a current gear in a first buffer stage of a gear shift sequence, and buffer portions that receive desired friction element data for a forthcoming gear in a second buffer stage of a gear shift sequence.

BRIEF DESCRIPTION OF DRAWINGS

FIG. 1 is a schematic representation of a geared automotive vehicle transmission mechanism capable of embodying the improved control system of the invention;

FIG. 2 is a chart showing the engagement and release pattern for achieving each of six forward-driving ratios and a single reverse ratio for the transmission mechanism of FIG. 1;

FIG. 3 is a chart showing gear speeds for the elements of the gearing of FIG. 1 during operation in each ratio as well as the torque of each element of the gearing of FIG. 1 for each ratio;

FIGS. 5a and 5b are a schematic view of the details of the pressure control system manager module;

DETAILED DESCRIPTION

Figure 4:
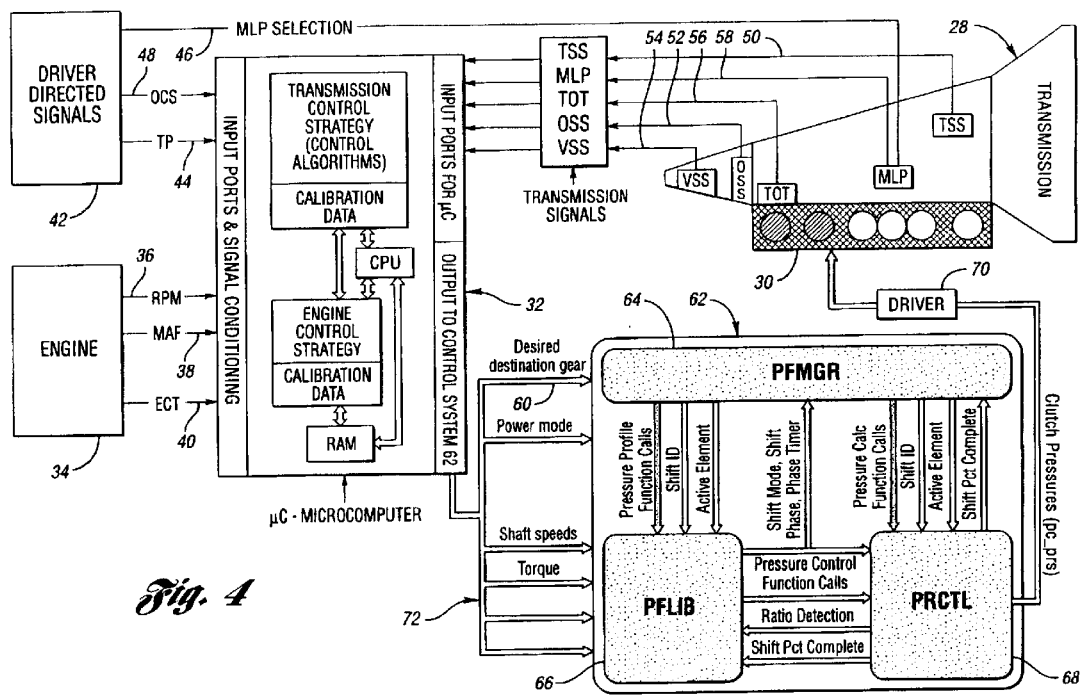
FIG. 4 is a pressure control system overview, in schematic diagram form, showing its principal modules; specifically, the pressure control system manager, the pressure profile library, and the pressure control calculation feature used during the shift events to calculate appropriate clutch pressures.

In FIG. 1, numeral 10 designates a torque input shaft. This shaft can be a turbine shaft in the case of a transmission having a hydrokinetic torque converter. The turbine of the torque converter would be connected to shaft 10, and the impeller of the torque converter would be connected to the crankshaft of an internal combustion engine, shown schematically in FIG. 4, as will be described subsequently.

The transmission of FIG. 1 comprises a compounded planetary gear system having a first gear unit 12 and a second gear unit 14. A torque output shaft 16 transfers torque to final drive gear elements and to the traction wheels for the vehicle.

Located between the input shaft 10 and the compound planetary gearing 12 and 14 is a simple planetary gear unit 18, which has a carrier C1, connected to the input shaft 10, a sun gear S1 and a ring gear R1. Sun gear S1 is anchored to the transmission housing 20 by overdrive clutch O/D, identified in FIG. 1 by the symbol CL7.

The ring gear RI for gear unit 18 is connected through intermediate shaft 22 to the ring gear R2 for gear unit 12. This connection includes forward-drive clutch CL4, which is engaged during forward drive operation in each ratio. Gear unit 12 includes a carrier C2, which is connected directly to torque output shaft 16. Output shaft 16 is connected also to ring gear R3 of gear unit 14. During low speed ratio operation, low-and-reverse clutch L/R, which is identified as clutch CL5 in FIG. 1, is engaged, thereby anchoring carrier C3. Thus, during low-speed ratio operation, a split torque flow path through the gearing elements 12 and 14 is effected.

Sun gears S2 and S3 for the gear units 12 and 14, respectively, are connected through clutch CL2 to the transmission housing during intermediate speed ratio operation. This connection is established by clutch CL2.

When clutch CL3 is engaged, the gear units 12 and 14 establish a direct-drive, one-to-one drive ratio.

As indicated in the chart of FIG. 2, the first gear ratio is established by engaging forward clutch CL4 and low-and-reverse clutch CL5 as overrunning coupling 24 is engaged. Overrunning coupling 24 connects the carrier C1 with the sun gear S1 to establish a one-to-one drive ratio through gear unit 18. If coast braking is desired during intermediate ratio operation, clutch CL5 can be engaged so that torque can be distributed from the carrier C3 to the housing 20 in either a forward direction or a reverse direction.

A ratio change from the first ratio to the second ratio is achieved by engaging overdrive clutch CL7, which anchors sun gear S1 of gear unit 18. This over-speeds ring gear R1, thereby changing the effective overall gear ratio to the next higher ratio.

A ratio change to the third ratio from the second ratio is achieved by releasing the overdrive clutch (CL7) and engaging the intermediate clutch CL2, which anchors the sun gear S2, thereby driving the carrier C2 and the torque output shaft 16 at an increased speed. Overrunning coupling MD3 overruns at that time.

A ratio change to the fourth ratio is achieved by engaging overdrive clutch CL7 as the intermediate clutch CL2 and the forward clutch remain applied. An upshift from the fourth ratio to the fifth ratio is attained by releasing the intermediate clutch CL2 and engaging the direct clutch CL3 and releasing the overdrive clutch CL7, which causes the elements of the gear units 12 and 13 to rotate in unison with a one-to-one ratio.

A ratio change from the fifth ratio to the sixth ratio is achieved by engaging the overdrive clutch CL7 with intermediate clutch (CL2) disengaged, which causes the ring gear R1 of gear unit 18 again to be overdriven as the direct clutch CL3 remains applied.

A fifth manual ratio may be achieved by engaging coast clutch CL1 together with direct clutch CL3. A third manual ratio may be achieved by engaging clutch CL1 together with clutch CL2. A second manual ratio can be achieved by engaging low-and-reverse clutch CL5 together with clutch CL7. A first manual ratio can be achieved by engaging clutch CL1 together with clutch CL5. Clutches CL1 replace the torque reaction function of the overrunning coupling MD1 to permit torque delivery in each direction. Similarly, the torque reaction function of overrunning coupling MD3 is replaced by a torque reaction function in both directions for clutch CL5.

FIG. 3 shows speed and torque data charts for each element of the gearing unit of FIG. 1 during operation in each of the six forward drive ratios, as well as the reverse ratio.

The gearing of FIG. 1 also has a power takeoff drive gear, as indicated by symbol PTO in FIG. 1, but that feature is not relevant to the present invention.

The transmission of FIG. 1 accommodates an intermediate shaft speed sensor identified in FIG. 1 by the symbol ISS and a turbine shaft (input shaft) speed sensor TSS. Similarly, an output shaft speed sensor for shaft 16 is identified in FIG. 1 by the symbol OSS. The speed data for the input shaft, the intermediate shaft and the output shaft are used in the control system, as will be explained subsequently.

Although the gearing illustrated schematically in FIG. 1 does not show a hydrokinetic torque converter, a torque converter would be used in a typical automotive driveline. A torque converter turbine, which would be connected to shaft 10, has a turbine speed sensor identified in FIG. 1 by the symbol TSS. The impeller of the torque converter would be connected to the crankshaft of an internal combustion engine. The data from the turbine speed sensor also would be used by the control system, as will be explained subsequently.

The architecture for the control system of the invention is indicated generally in outline form in FIG. 4. The transmission is shown at 28. A transmission hydraulic control circuit for the transmission 28, shown at 30, is under the control of a microprocessor controller 32, which may include both engine control strategy and transmission control strategy. The engine is shown at 34. The input ports and signal conditioning portion of the microprocessor 32 receive engine data, such as speed data 36, mass air flow data 38, and engine coolant temperature data 40. It also receives selected driver-directed input signals from driver input 42. Typical driver-directed input signals would be the engine throttle position signal 44, the manual lever position selector position 46 and the overdrive cancel switch 48. The manual lever position selector information (MLP) is distributed directly to the transmission 28, which determines a manual valve position signal 58.

The controller 32 receives feedback signals from the transmission including the turbine speed sensor signal 50, the output shaft speed signal 52, a vehicle speed. signal 54, transmission oil temperature signal 56, and manual valve position signal 58.

The transmission control strategy under the control of the CPU portion of the processor will develop a desired destination gear, as shown at 60. The algorithms executed by the CPU, which are stored in memory registers, are executed in response to the input variables from the driver and the engine, as well as the feedback variables from the transmission, to develop a desired destination gear, which is distributed to the pressure control system indicated generally in FIG. 4 by reference numeral 62.

The control system architecture indicated in FIG. 4 includes a pressure profile manager sub-module 64, a pressure function library sub-module 66, and a pressure control function sub-module 68. Clutch pressure commands are developed by the control system 62 and transferred to output driver 70, which communicates with the hydraulic control system 30 for the transmission 28.

The desired destination gear is developed by the controller 32, and the execution of the destination gear command is carried out by the control system 62. The result of the execution of the input data by the control system 62 involves a command pressure that is delivered to each clutch independently. In an ideal arrangement, there would be one solenoid dedicated to the control of each clutch or friction element in the control system 30 for the transmission 28. The output pressure commanded by the system 62 is based on the desired gear and the current operating conditions, such as transmission temperature, input torque, shaft speeds, etc. These inputs are generally indicated in FIG. 4 at 71. The software for control system 62 thus acts as an interface between the output driver circuits of the transmission microprocessor controller 32 and the hydraulic control system 30 of the transmission. It ensures that the appropriate pressure is delivered to each clutch or brake friction element under all driving conditions.

The profile manager 64 provides the highest level of control for the entire pressure control system. It is responsible for processing all changes in the desired gear, either during shifting or non-shifting. It functions to control a so-called change-of-mind shift event, where a given gear sequencing is interrupted by a new instruction given by the operator for a different destination gear. For example, if a 1–3 shift is commanded, the control system is configured to command a sequential 1–2–3 shift for normal sequencing. It identifies the active elements, the pressure profiles and the timing of the start of each shift.

The profile library sub-module 66 specifies the pressure control action that is required to apply or to release an element during a shift or an engagement of the clutch or brake. It consists of separate states, such as boost, stroke, closed-loop control, etc., which are needed to complete a shift.

Sub-module 66 comprising a selection of several profiles are required to complete all shifts or engagements. The profiles that are required for a particular transmission depend upon the kinematical requirements of the transmission. The pressure profiles required for a synchronous shift, for example, are different than those required for a swap shift.

The pressure control sub-module 68 consists of a collection of algorithms that are used for the purpose of pressure calculations using the inputs delivered to the system 62. Both the manager 64 and the profile library 66 use calculations in sub-module 68 to monitor the status of each shift and to provide calculations of variables, such as starting torque, to other regions of the pressure control.

The pressure profiles, the transmission elements that are affected during a shift, and the gear sequencing can be changed by appropriately calibrating the program manager 64. Further pressure profiles can be added or deleted depending upon the transmission requirements.

Figure 5B:
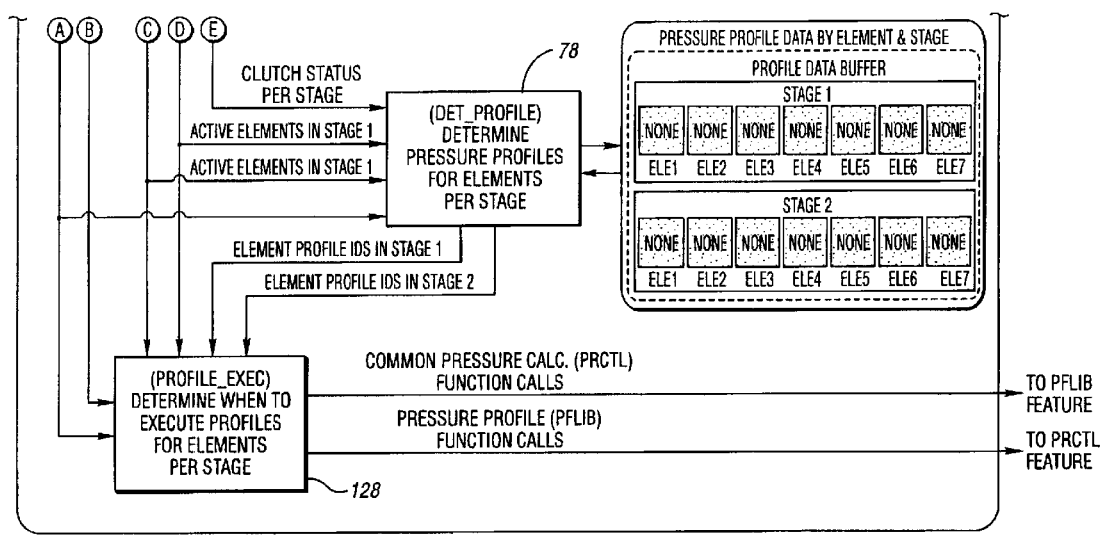

FIG. 5a and 5b are a detailed view of the control regions of the manager PFMGR. For simplicity, FIGS. 5a and 5b illustrate discrete diagram blocks that illustrate functions carried out by the manager PFMGR. For each desired destination gear established at 60 (see FIG. 4) by the transmission control strategy of microprocessor 32, the manager 64 will effect a shift determination and staging routine. This determines and commands the appropriate shift needed to reach the destination gear, regardless of whether the shift involves a single stage shift or a multiple stage shift. This is illustrated in block 72 in FIG. 5*a*.

The shift that is desired can be effected by determining at block 74 the commanded destination gear developed by the processor 32 while taking into account a change-of-mind request. Thus, an initial determination is made regarding whether a change-of-mind or a non-change-of-mind event is needed.

Using the information provided at block 74, block 72 delivers information to block 76, as the control elements of the transmission at 30 are determined and the control status of each element is established. At this point, the state changes for the friction elements involved for each shift and the required shifts to reach the desired destination gear are defined.

A determination of the pressure profiles for the friction elements takes place at block 78 using the information supplied by blocks 72 and 76. The profiles that are needed for each of the friction elements for a given shift are determined while reaching the desired destination gear.

The commanded pressure profiles for the elements involved in the current shift are established while preparing other elements for activation when multiple stage shifts are required.

The manager (PFMGR) interacts with the profile library at 66 by commanding the appropriate pressure profiles needed for the elements involved in achieving a desired transmission destination gear. Further, the manager interacts with the pressure control sub-module 68 by triggering commonly used detection routines; e.g., ratio change start and ratio change end. For the various pressure profiles in library sub-module 66, the manager PFMGR also executes pressure control calculations needed throughout the duration of the shift, such as the percent shift complete calculation, line pressure, etc. When a desired destination gear is determined, the manager responds by determining and commanding the appropriate shifts that are needed to reach that destination gear from the current state. The exact shifts needed to change the transmission gear state from the current gear to the desired destination gear are configurable in the shift determination subsystem shown at 72. The exact shifts that are configured are from a pre-selected set of shift IDs chosen according to the requirements of the transmission. There may be 75 independent shift IDs, for example, for the transmission shown in FIG. 1.

The control system of the invention creates an opportunity to improve control of a shift and to look beyond the current shift to prepare for future shift events. This is useful for sequenced shifts as well as for change-of-mind shifts. It also provides a means for compensating for system delays such as delays inherent in a hydraulic system involving fluid passages and control valves. For example, if a 2–4 shift is desired, but the shift is calibrated to be sequenced as a 2–3–4 shift, the system will know ahead of time that during the 2–3 shift there is a 3–4 shift that will be performed next. Having the capability of looking ahead for pending shifts permits the controller to prepare elements to be used. This greatly improves the overall system response and achieves a seamless ratio change from one ratio to the other without torque interruptions and torque disturbances that can be perceived by the vehicle operator.

Figure 6:
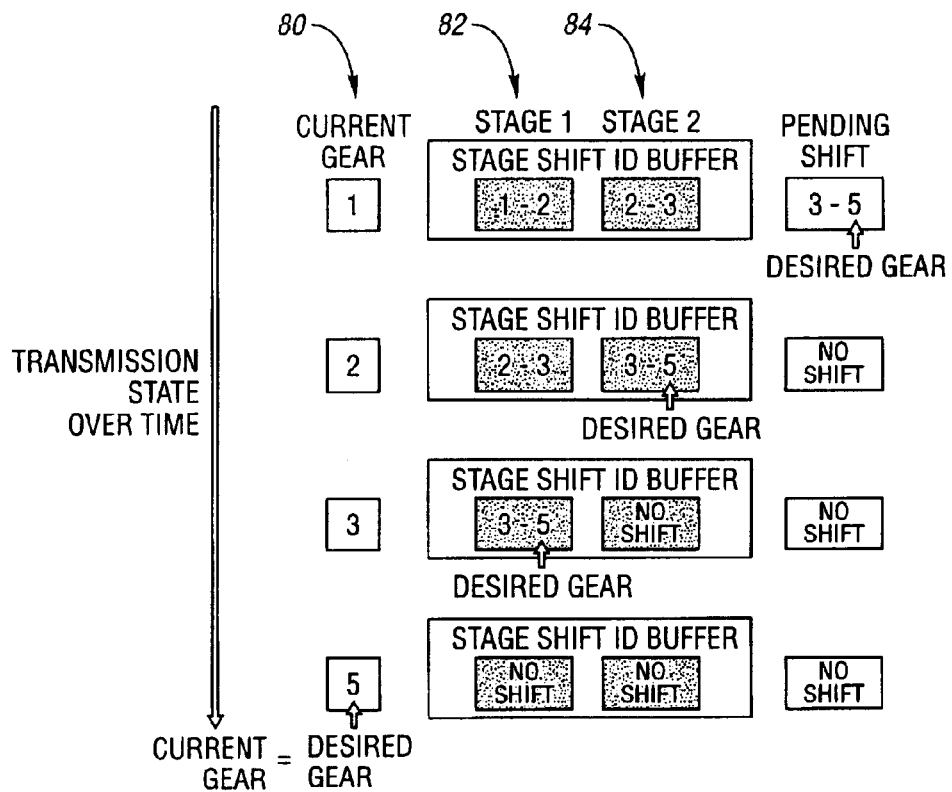
FIG. 6 shows the shift stages concept for a 1–5 shift sequenced as a 1–2–3–4–5 shift.
Figure 7:
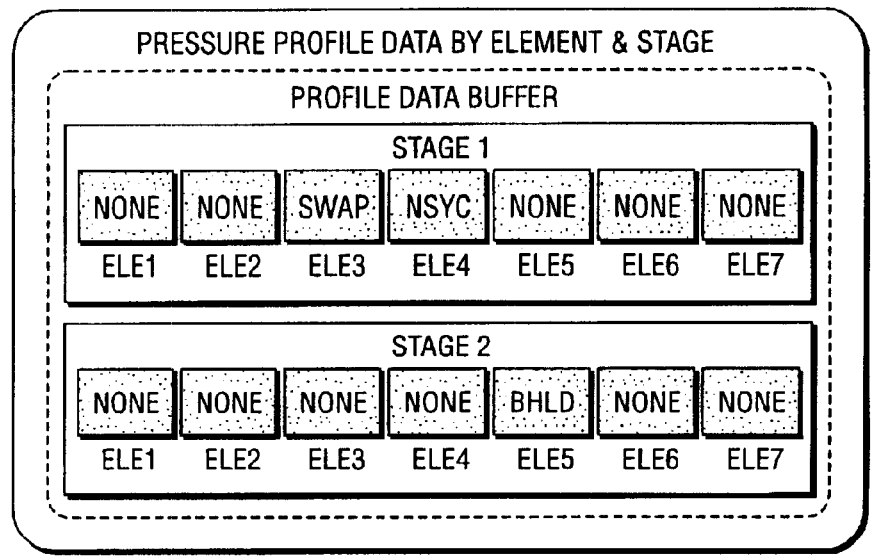
FIG. 7 shows the pressure profile data buffer module, seen generally in FIG. 5, for determining pressure profile data by element and stage.

The ability to look ahead for pending shifts while performing a current shift is accomplished by "staging" the shifts. The current shift being performed at any given instance is defined as a stage 1 shift. The pending shift is defined as a stage 2 shift. When the stage 1 shift is completed, the stage 2 shift becomes active. The new shifts in the sequence, as the final desired gear is approached, are loaded into stage 2. The shifts then will continue to roll over from stage 2 to stage 1 as they are completed until the final desired gear is achieved. This concept is illustrated in FIG. 6, where the current gears in a shift sequence are shown in the first column 80. The destination gear is gear 5 in the example of FIG. 6, and the initial gear of a 1–2–3–5 sequenced shift is at the top of the column. The first stages of the shift are in column 82 and buffer stages 2 for each gear are in column 84. By having knowledge of the pending shift in stage 2, the program manager has the opportunity to prepare future transmission actuator elements before the current shift in stage 1 is complete.

Figure 13:
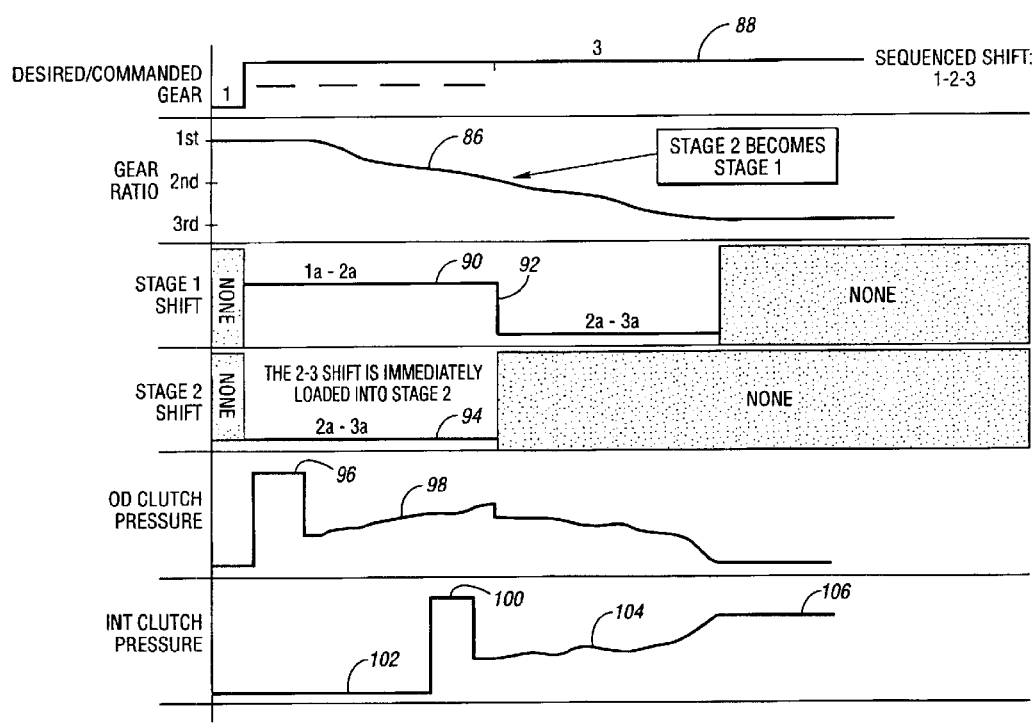
FIG. 13 is an engagement time plot of the elements involved in a 1–3 shift, sequenced as a 1–2–3 shift, for the transmission of FIG. 1.

FIG. 13 illustrates a 1–3 shift event, which is sequenced as a 1–2–3 shift. The gear ratio changes, in the example of FIG. 13, as shown at 86. The final gear ratio or destination gear is 3, as shown at 88. The stage 1 shift is a 1–2 shift, as shown at 90. As the 1–2 shift in stage 1 ends at 92, the information for a 2–3 shift is transferred or loaded into stage 1, as shown at 94. The overdrive clutch pressure at the beginning of the 1–2 shift is boosted, as shown at 96, and is gradually increased as shown at 98 after the boost phase ends. The intermediate clutch pressure remains at a low level, as shown at 102, until the beginning of stage 2 is approached. This is shown at 100. Thus, the intermediate clutch is prepared for engagement prior to the end of stage 1. Overdrive clutch pressure at 98 is prevented by the software from increasing to full line pressure in order to condition the overdrive clutch for release as third gear is established. The pressure of the intermediate clutch then increases, as shown at 104, until it approaches a steady-state level at 106.

In addition to issuing the shift commands in stage 1 and in stage 2, the shift determination subsystem also issues ending gears with engine braking information for each stage. For example, if a 1–2 shift is issued for stage 1 and a 2–3 shift is issued for stage 2, the ending gears for each stage are 2 and 3, respectively. By issuing ending gears in each stage, the elements needed to achieve those gears can be determined. The ending gear for stage 1 is the currently commanded gear, which may not be the same as the desired destination gear in the case of multiple stage or change-of-mind shift events. The ending gears per stage thus define the desired transmission state path that is needed to achieve the driver requested gear.

A change-of-mind shift is defined as a shift event in which the driver demand changes (e.g., by throttle pedal movement) during a shift such that a new gear is desired other than the original destination gear. The manager 64 (PFMGR) has a subsystem 74 specifically dedicated for handling change-of-mind shift events. It accepts a desired destination gear as an input and determines if the event is a change-of-mind shift. It commands a destination gear accordingly. The commanded destination gear is used in the shift determination subsystem 72 to handle the change-of-mind event. The change-of-mind subsystem 74 also keeps track of the current gear, which is also used by the shift determination subsystem. Together, the change-of-mind and shift determination subsystems are designed with the capability to handle any change-of-mind event.

The change-of-mind events are classified into two different types; that is, they may be same-direction, change-of-mind shifts or change-of-direction, change-of-mind shifts. A change-of-direction, change-of-mind shift is a shift event in which the new desired gear is in the opposite direction from the current shift event. For example, during a 2–4 shift, the third gear may be desired. In a same-direction, change-of-mind shift, the new desired gear is a continuation of the current shift in the same direction. For example, the fourth gear may be desired during a 2–3 shift.

Figure 14:
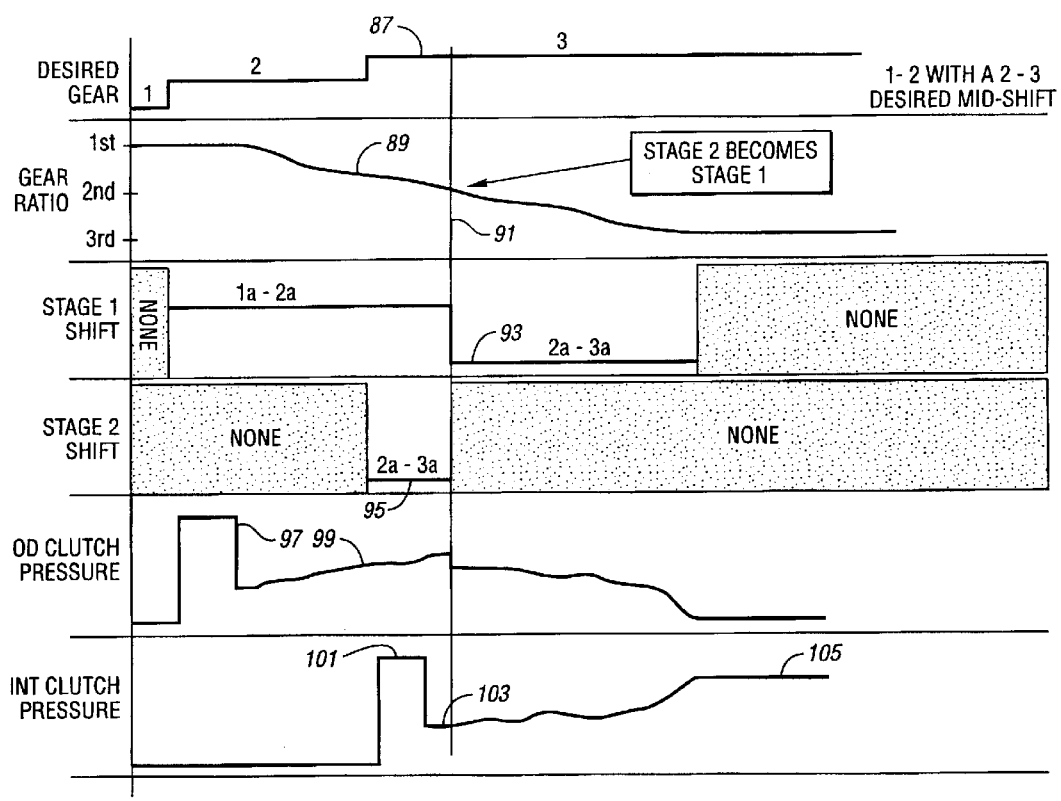
FIG. 14 shows a time plot of the elements involved in a change-of-mind shift; specifically, a 1–2–3 shift sequence as the third gear is commanded as a destination gear during a 1–2 upshift.

The transmission of FIG. 1 has so-called swap shifts, non-synchronous shifts, and synchronous shifts, as explained with reference to FIGS. 1 and 2. Each type of shift has a specialized set of pressure control algorithms that are appropriate to control the shift event. A change-of-direction, change-of-mind shift and a same-direction, change-of-mind shift are handled with specific rules in the shift determination subsystems 72 and 74. Any same-direction, change-of-mind shift will continue performing the current shift in stage 1 and will load up for the next shift in stage 2. An example of this would be a backing-out and desiring third gear as the destination gear during a 1–2 upshift. The 1–2 upshift occurs in stage 1 and the 2–3 shift is loaded into stage 2. FIG. 14 is a plot of a 1–2–3 same-direction, change-of-mind shift event. In FIG. 14, the desired gear is shown at 87.

The desired gear, which is the third gear, is indicated late in the first stage if a gear ratio change is occurring as shown at 89. Stage 2 becomes stage 1 at the time indicated by the reference line 91. The information in stage 2 changes from location 95 to location 93. The overdrive clutch pressure, which is required for a second gear, is boosted as shown at 97 to fill the clutch initially and to take up slack in the actuator for the friction element. Thereafter, the pressure increases as shown at 99. This pressure at 99 does not increase to full line pressure because the overdrive clutch is prevented from doing so by the software to condition the overdrive clutch to be released in the next shift.

In order to effect the third gear, which is now required by the change-of-mind shift event, the intermediate clutch pressure must be boosted as shown at 101 before the end of stage 1. This prepares the intermediate clutch for actuation. The pressure in the intermediate clutch then builds up, as shown at 103, until the intermediate clutch is fully applied as shown at 105.

Figure 15:
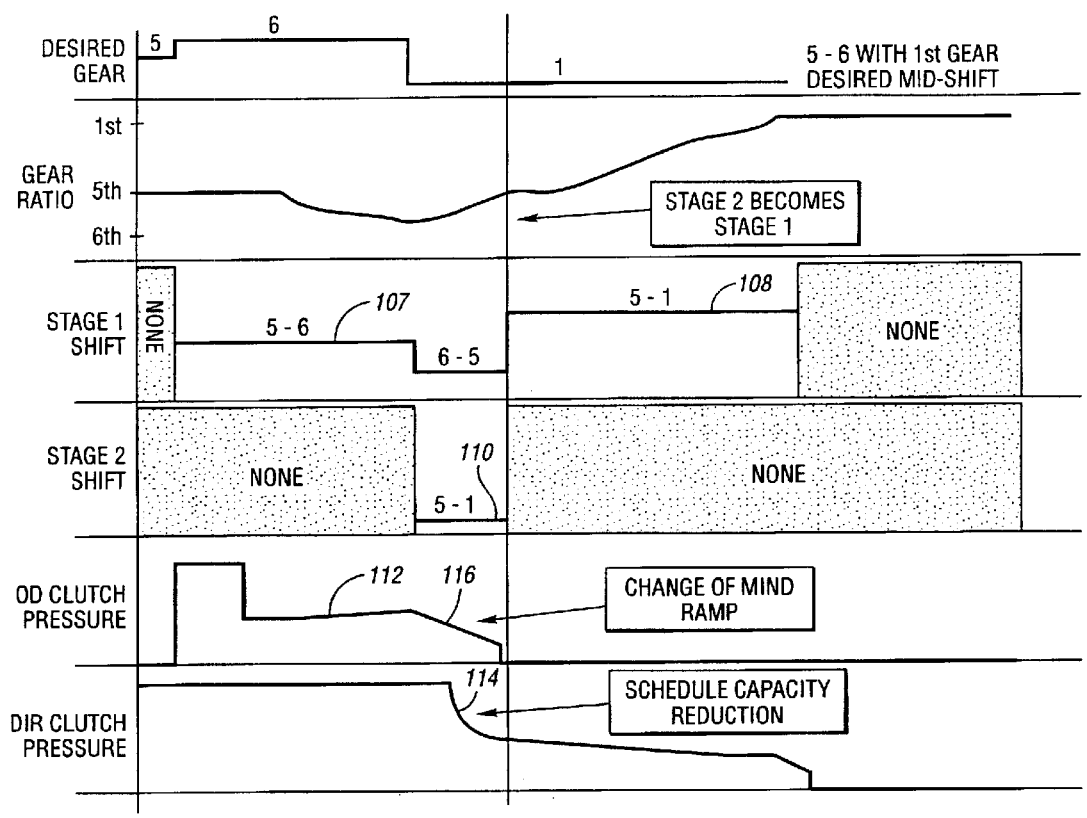
FIG. 15 is a plot corresponding to the plot of FIG. 14, but which shows a change-of-mind and change-of-direction shift event wherein the change-of-mind event is in the opposite direction wherein the current gear shift goes back to the original gear and loads a shift in stage 2 to achieve the final desired gear during a 5-6-1 ratio change.

A change-of-direction, change-of-mind shift event is handled differently because there then is a clear indication from the driver that the current shift is no longer appropriate and that the new desired destination gear should be achieved quickly. An example is a 5–6 back-out shift followed by a large tip-in requiring a first gear destination. In this case, the change-of-mind is handled by first turning around the current shift in stage 1 to go back to the original gear; i.e., sixth gear back to fifth gear in stage 1, seen at 107 in FIG. 15, and loading a shift in stage 2 to achieve the final desired gear, i.e., fifth gear to first gear. This is seen at 108 and 110.

During such a 5-6-1 change-of-direction, change-of-mind shift event, the overdrive clutch pressure during stage 1 must follow the profile shown at 112. The first gear destination requires disengagement of the direct clutch, as shown at 114, as the overdrive clutch pressure is ramped down as shown at 116.

Figure 16:
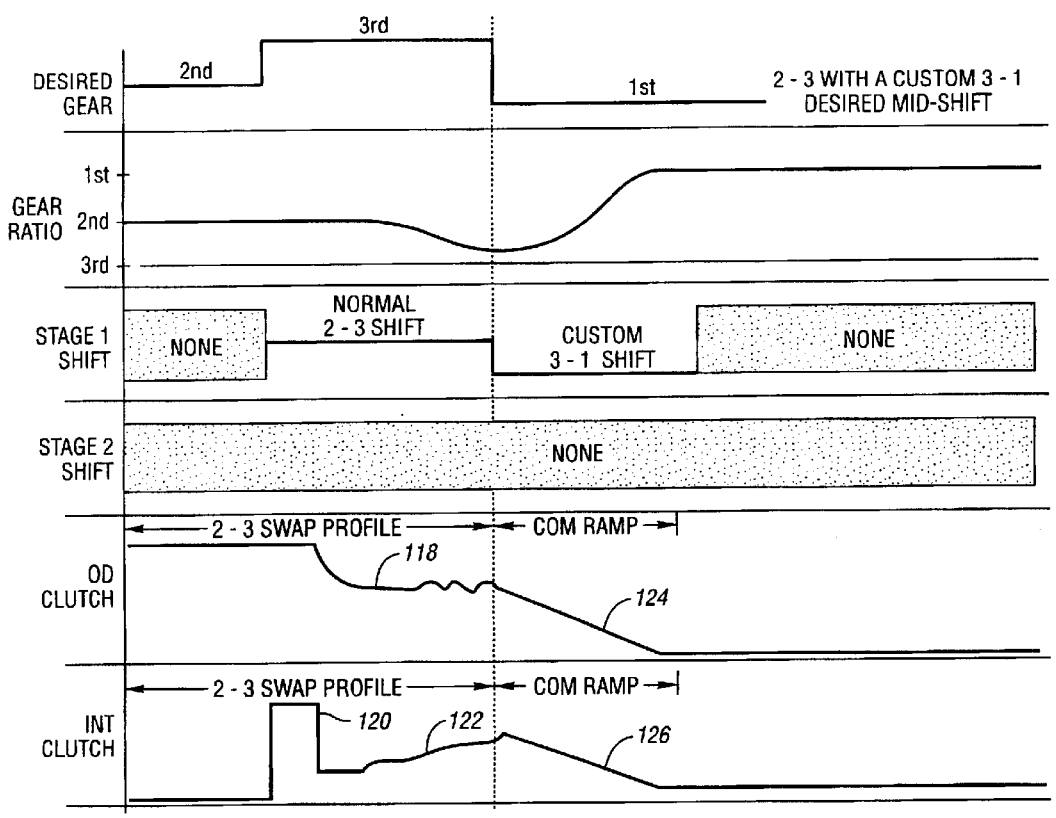
FIG. 16 is a time plot corresponding to the plot of FIG. 14 and the plot of FIG. 15 wherein the shift is a change-of-mind shift and a change-of-direction shift during a 2-3-1 ratio change.

The control system is capable of handling change-of-direction and same-direction COM events in any custom fashion by handling the events directly. For example, during a 2–3 shift, if the desired gear changes to first gear instead of returning to second gear followed by a 2–1 shift, a 3–1 shift could be commanded directly in stage 1. This is illustrated in FIG. 16. In this case, the overdrive clutch is disengaged during stage 1, as shown by the swap shift pressure profile at 118. The intermediate clutch, following a boost of pressure at 120, gradually is pressurized as shown by the swap shift profile at 122 in preparation for the engagement of the intermediate clutch during the next stage. Both the overdrive clutch and the intermediate clutch are ramped down since both of these clutches must be disengaged to achieve first gear (refer to FIGS. 1 and 2).

After the shifts are issued for stage 1 and stage 2, in the case of a multiple-stage event, together with starting and ending gears for each stage, the clutch or brake elements involved in the shifts needed to reach the commanded destination gear must be determined. This is done at subsystem 76. Furthermore, the desired status of each element must be determined. To identify these elements, each friction element is numbered starting with 0 for the direct clutch CL3 and ending with 6 for the forward clutch. This is shown in FIGS. 5a and 5b. The number assigned for each element is configurable. These clutch members or element identifications are used to identify which clutches are involved in shifts in stage 1 and stage 2. The subsystem for processing and determining elements is configurable for up to seven elements, as indicated in FIGS. 5a and 5b.

To determine the elements and the desired states for each stage, an element transition table is needed. The transition table is fully configurable. It contains information regarding which elements and their states are needed to maintain each transmission gear.

The transmission of FIG. 1 includes an element processing subsystem that tracks and issues up to three element IDs for the shift in stage 1. If there is a pending shift in stage 2, up to three additional element IDs are also issued for stage 2. This also is seen in FIGS. 5a and 5b. In addition, the subsystem 76 also issues desired clutch status for each element for each stage (e.g., clutch 1: oncoming, clutch 2: off, clutch 3: off-going, etc., per stage). Although the transmission disclosed tracks up to three elements per stage, it can be fully expandable to handle more elements for other transmission applications.

FIG. 5a shows the outputs of the element processing subsystem that are stored and tracked in the manager PFMGR.

Using the shift IDs, the element IDs, and the element status for each stage obtained from subsystems 76 and 72, a pressure profile from the library sub-module 66 can be issued for each element involved in the shift for stage 1 and stage 2. The manager contains a subsystem, shown at 78 in FIG. 5b, which is dedicated to the tracking of the pressure profiles needed for elements involved in the current shift in stage 1 and in the pending shift in stage 2.

A pressure profile, identified numerically, is a state machine describing what type of pressure control action to use on the clutch or brake involved in the shift. For example, there are profiles for controlling the oncoming clutch in a power-on swap shift or the off-going element in the power-off synchronous downshift. The pressure profile essentially controls the pressure control behavior of the friction element based on the progression of the shift event. The pressure profiles used can be different based on the shift event, the elements used and the driveline torque direction.

For the transmission of FIG. 1, up to three pressure profiles for three elements can be configured for each shift event in each stage. They are also configurable based on the power mode; that is, the driveline torque direction. Pressure profiles in stage 1 are used to control the current shift event, whereas those used in stage 2 are used for preparing elements. For example, pressure profiles used in stage 2 include pre-boosting an element or pre-capacity reduction for an element. The actual pressure profiles to be configured are contained in library sub-module 66, which essentially is a library of all available profiles. The pressure profiles required depend on the particular transmission being used and the desired control goals of the pressure control system.

FIG. 5b contains the outputs of the pressure profile determination subsystem that are stored and tracked by the program manager 64.

Once the pressure profiles have been determined for elements involved in the current shift for stage 1 and the pending shift for stage 2, the program manager can begin to execute the profiles. The program manager has a subsystem 128, seen in FIG. 5b, for executing the profiles.

The pressure profiles for the elements in the current shift stage (stage 1) are commanded immediately, whereas the elements involved in the pending shift (stage 2) are pre-staged by commanding their pressure profiles based on an estimate of when the current shift event will be completed. During the pre-staging, the elements are controlled to a point where they are almost ready to start the pending shift once the current shift is complete. That pre-staging must be coordinated with the shift in stage 1.

The ability to control each clutch separately introduces the possibility of tie-ups. In order to reduce the likelihood of tie-ups, the elements that are being pre-staged in stage 2 should not be started too early. The earlier an element is pre-staged, the greater the chance a tie-up could occur. This problem is solved in the program manager by estimating the time left in stage 1 during a shift and looking at the amount of time it takes to fill the element in stage 2 or the time to reduce the capacity of an element in stage 2.

Figure 8:
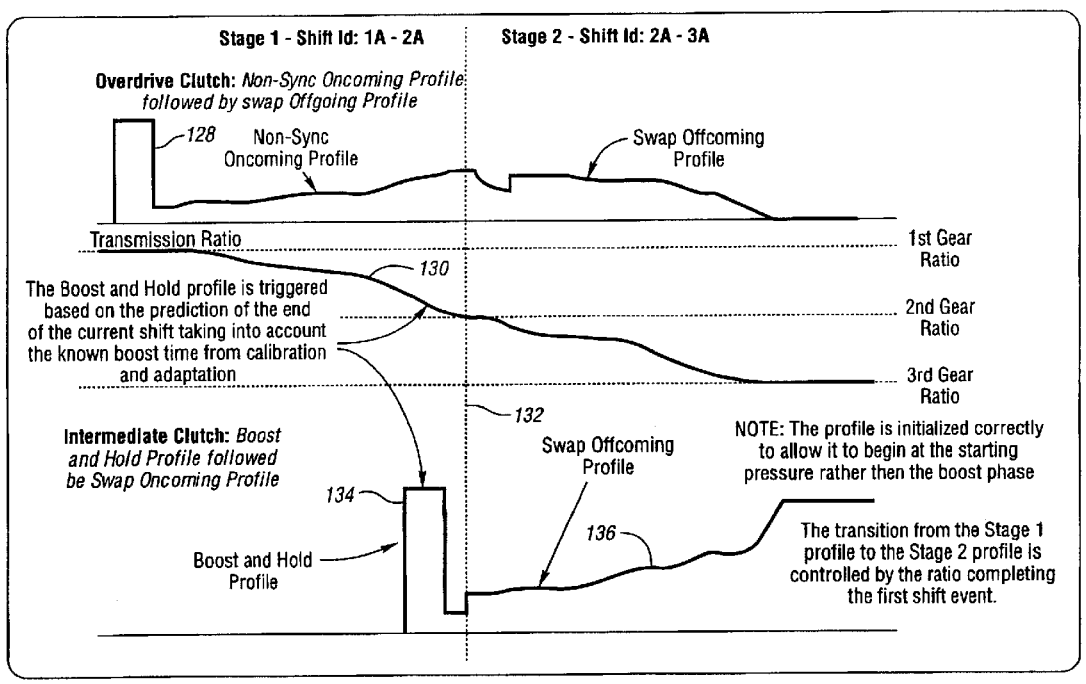
FIG. 8 is a chart showing a pressure profile execution and pre-staging characteristic for a 1–2 shift.

FIG. 8 illustrates this timing arrangement for the overdrive clutch and the intermediate clutch during a 1-2-3 sequenced upshift. In FIG. 8, stage 1 involves boosting the overdrive clutch at the outset of the 1–2 shift, as shown at 129. The ratio changes from the first ratio to the second ratio, as indicated at 130 during stage 1. Before the end of stage 1 at 132, the intermediate clutch is boosted, as shown at 134. This prepares the intermediate clutch for engagement during stage 2, which involves increasing the pressure, as indicated by the profile at 136.

Figure 9:
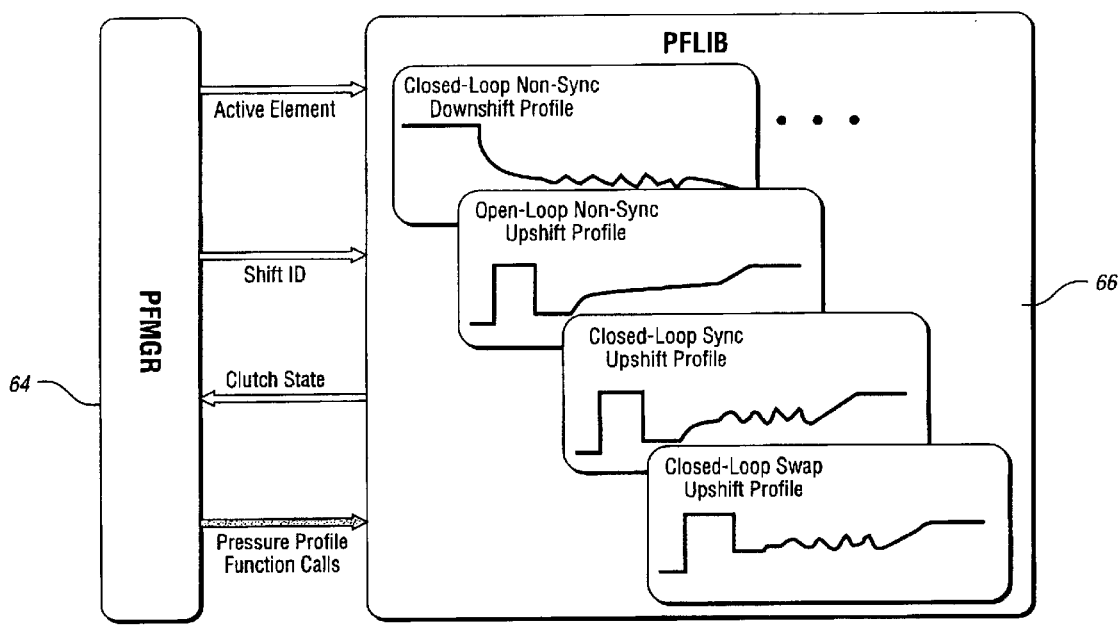
FIG. 9 is a schematic illustration of the pressure profile library for use with the program manager of FIG. 5.

The pressure profile library at 66 is a collection of pressure profiles that either apply or release a single clutch. This is illustrated in FIG. 9. Four of many profiles are illustrated in FIG. 9, the number depending upon the type of transmission. Each shift event will include one or more pressure profiles depending on how many clutches are involved in the shift. The transmission of FIG. 1 may have 19 pressure profiles, which cover synchronous shifts, non-synchronous shifts, swap shifts, static engagement, coast engagement, and change-of-mind shift events. For example, a synchronous shift uses two pressure profiles that are specifically designed for that purpose. One profile will control the oncoming clutch, and the other profile will control the off-going clutch. Some profiles are dedicated to positive driveline torque conditions, and some are dedicated to negative driveline torque conditions. Some profiles can handle both.

Figure 17:
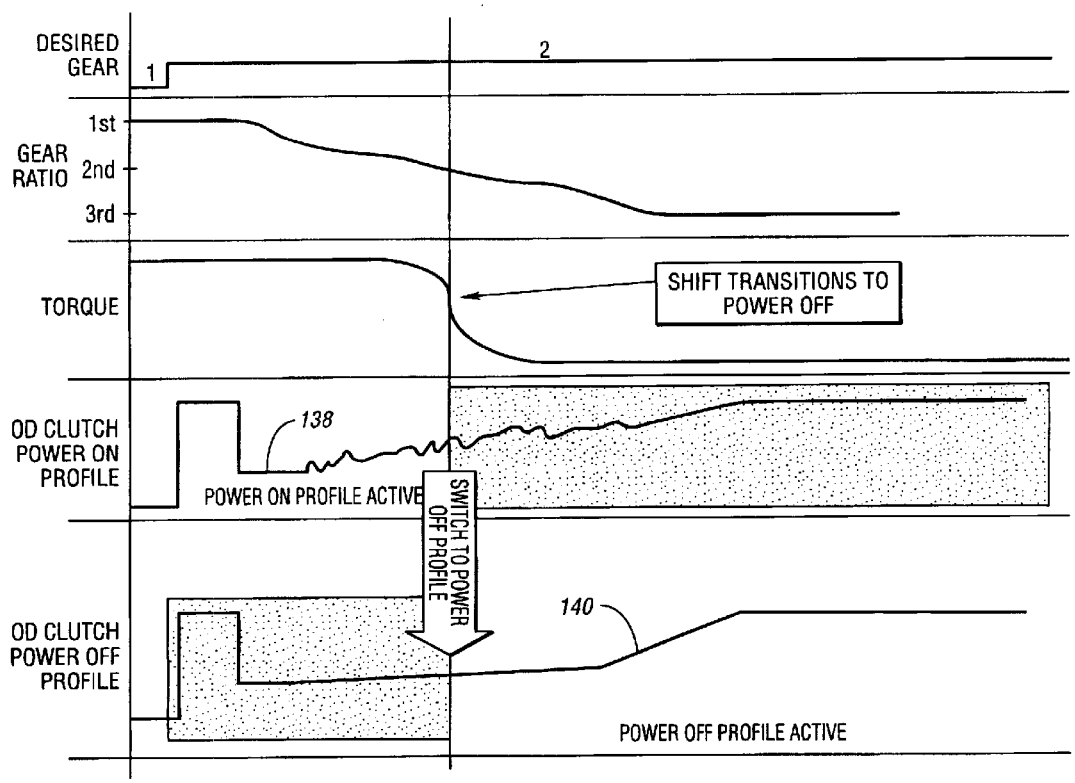
FIG. 17 is a plot of profiles for positive drive torque conditions and negative drive torque conditions, and which indicates what happens when the driveline torque changes from positive to negative and negative to positive during a shift.

All of the profiles can be interrupted at any time and the control can be passed to another profile when the need arises. This happens most often when driveline torque changes from a positive direction to a negative direction or from a negative direction to a positive direction during a shift. This is illustrated in FIG. 17 where the overdrive clutch, during stage 1, is controlled using a pressure profile 138 for a power-on condition. That is followed by profile 140 during stage 2 for the overdrive clutch for a power-off condition. There also may be two profiles dedicated solely to preparing the clutch to apply or release. These two profiles are called for during a shift to prepare the clutches that are going to be used in the next shift.

Each pressure profile is composed of a group of smaller pressure control routines that actually command the desired pressure. The main purpose of the pressure profile is to determine which of these pressure control routines is needed and when to transition between them. For example, the first two actions for the average oncoming pressure profile is to effect boost and start pressure. The profile will calculate how long the clutch should be boosted and then call for the boost control pressure routine, which will calculate the boost pressure and command the actual variable force solenoid for a particular friction element in the control system 30 of FIG. 4. When the boost time expires, the profile will then call the start pressure control routine, which will calculate the clutch pressure needed to start the shift and command the variable force solenoid to achieve this pressure. The profile will then monitor the gear ratio to determine when the shift has started and when to move onto the next phase.

Figure 10:
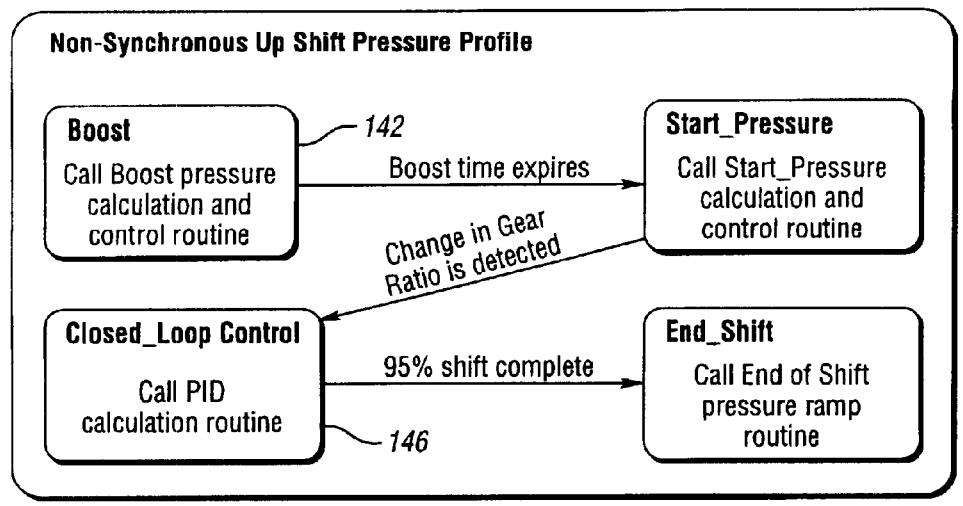
FIGS. 10 and 11, respectively, show a simplified pressure profile state diagram and a pressure trace corresponding to a typical change in ratio.
Figure 11:
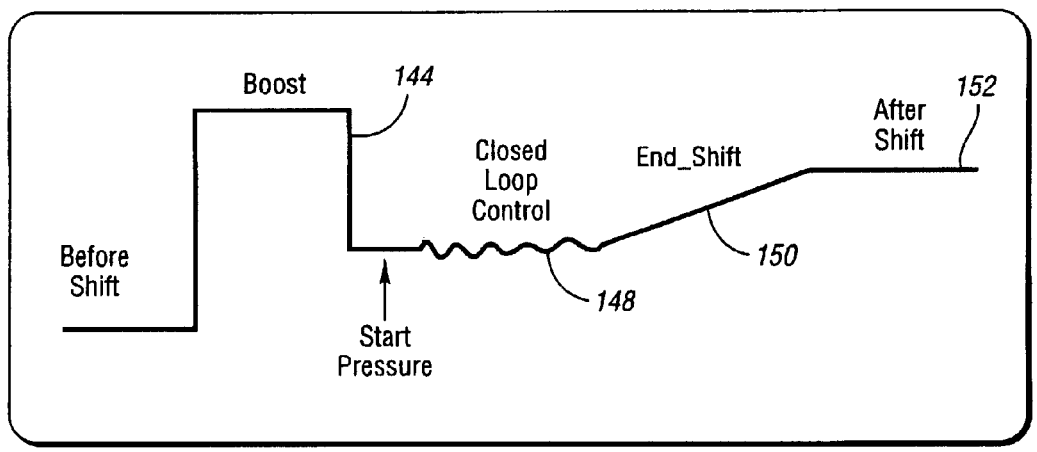

FIGS. 10 and 11 contain schematic block diagrams and a pressure profile for a non-synchronous upshift. Before the shift is initiated, a boost is called for at block 142. This boost is illustrated at 144 in FIG. 11. The change in gear first involves a command for a start pressure, which is followed by a closed loop control at block 146. The pressure trace at that point is shown at 148. When the shift is near completion, the shift pressure is ramped, as shown at 150, until the shift is complete at 152.

Figure 12:
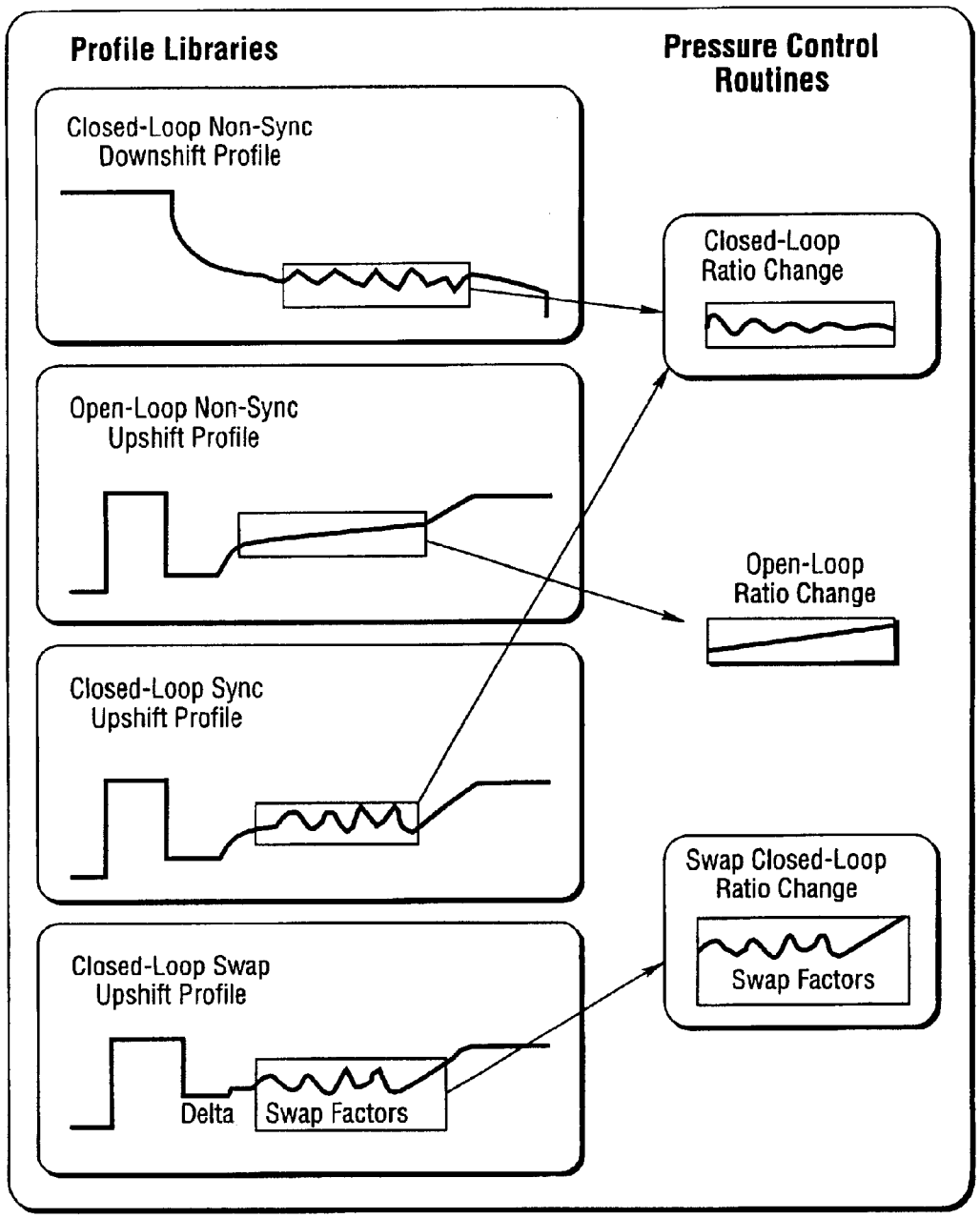
FIG. 12 is a schematic illustration of a pressure control calculation feature illustrated generally in FIG. 4 wherein typical profile libraries are illustrated.

The pressure control calculations at subsystem 68 (FIG. 4) use a collection of control routines. The appropriate clutch pressures differ under different operating conditions. This is illustrated in FIG. 12. These routines are configurable based on the transmission design. The calculations cover many conditions, some of which are shift specific, such as swap shifts, synchronized shifts, etc. Some examples of the types of calculations include (i) boost pressure, (ii) starting pressure, (iii) closed loop power transfer, (iv) aggressive ramp, (v) closed loop ratio change, and (vi) end of ramp. The profile that is assigned to control the elements during a shift calls out the appropriate series of pressure control routines to create the pressure trace necessary to control the shift event.

Figure 18:
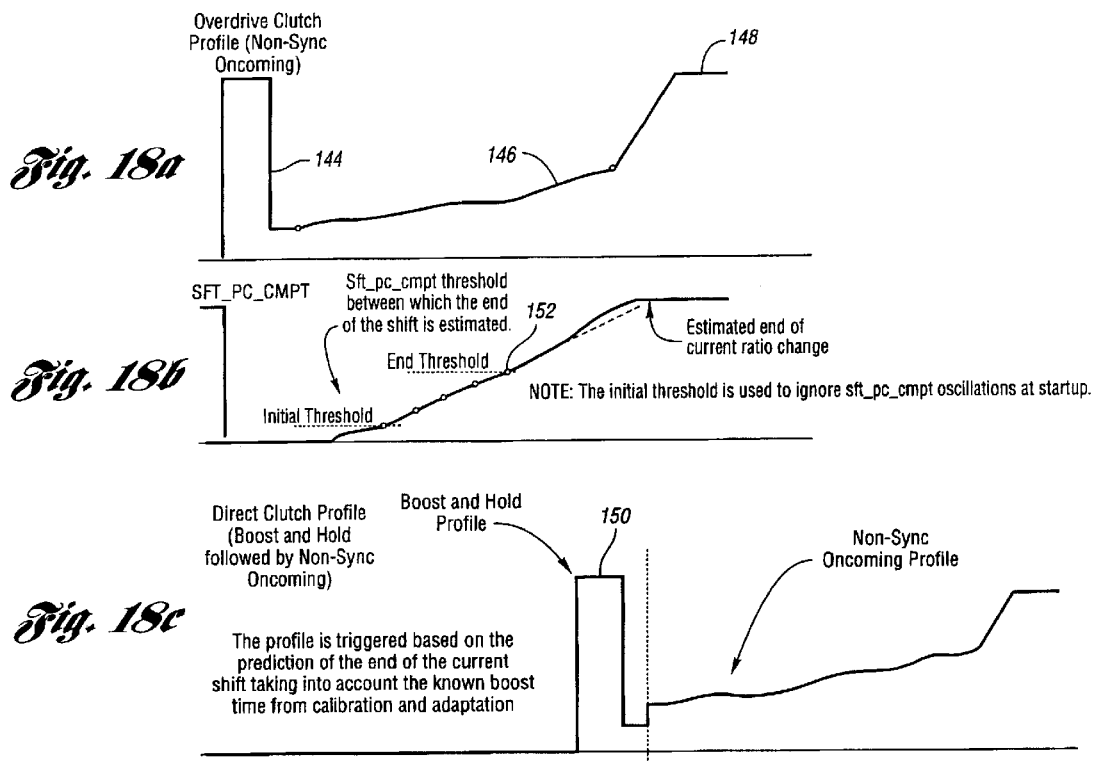
FIGS. 18a–18c, respectively, show the overdrive clutch profile, a shift completion time plot, and the direct clutch profile during a 1–2 shift when the transmission undergoes a power-on 1–2 upshift and the driver backs out to a desired gear change to sixth gear.

FIGS. 18a, 18b and 18c illustrate the ratio change as a power-on 1–2 upshift in which the driver backs out and the desired gear changes to sixth. In stage 1, the current shift is identified, as explained previously, by one of the many shift IDs. The shift is performing the desired ratio change based on the calibrated shift schedule. In stage 2, the elements are being prepared for an upcoming shift based again on the current driver demand coming from the shift schedule or the sequence shift that is a result of calibration. The goal is to minimize the time between the end of the ratio change in stage 1 and the beginning of the ratio change being prepared in stage 2. In order to minimize this interval, a predictive algorithm is introduced to estimate when the current shift will be done and to begin the action of the involved element in stage 2. An element in stage 2 may be an element that is currently off, but can be pre-boosted or it may be an element, which is currently on, and is brought to a pressure just above the holding capacity to prepare for the next shift.

In the event that the boost time stroke pressure or the holding pressure are inaccurate, the possibility for tie-up is present. To reduce the likelihood of a tie-up, the predictive algorithm is used to schedule when to begin the pre-boost or capacity reduction in stage 2. Since boost times and capacity reductions are known by calibration and adaptation, they can be subtracted from the estimated shift duration to properly start the elements and have them at correct pressures just in time to begin the shift scheduling stage 2.

In FIG. 18a, the overdrive clutch profile includes a boost phase at 144 for the overdrive clutch, which is followed by a pressure buildup in accordance with the profile shown at 146 until the clutch is fully applied at 148. The overdrive clutch must be engaged as indicated in FIG. 2. On a change to the sixth gear, which would occur during a back-out during power-on, the direct clutch must be applied. This requires a boost feature in the pressure profile as shown at 150 in FIG. 18c. This boost occurs at an appropriate time prior to the end of stage 1, taking into account the boost time from calibration information. In order to determine the appropriate time, the shift complete information from FIG. 18b must be used. The end of the shift is estimated by using the best fit estimate of the slope of the percentage complete curve. The end threshold value for shift complete occurs at 152. After the end threshold value 152 is reached, the slope of the shift complete plot is fixed. It is not thereafter updated during the shift. The initial threshold value for shift complete is greater than zero, as shown in FIG. 18b. This is done in order to ignore extraneous oscillations that might occur on startup.

SUMMARY

In order to show a comparison of the control functions of the pressure controller of the present invention, including pre-staging, with a pressure control that does not include the pre-staging function, reference now will be made to FIGS. 19 and 20. This will serve as a partial summary of the preceding description.

Figure 19:
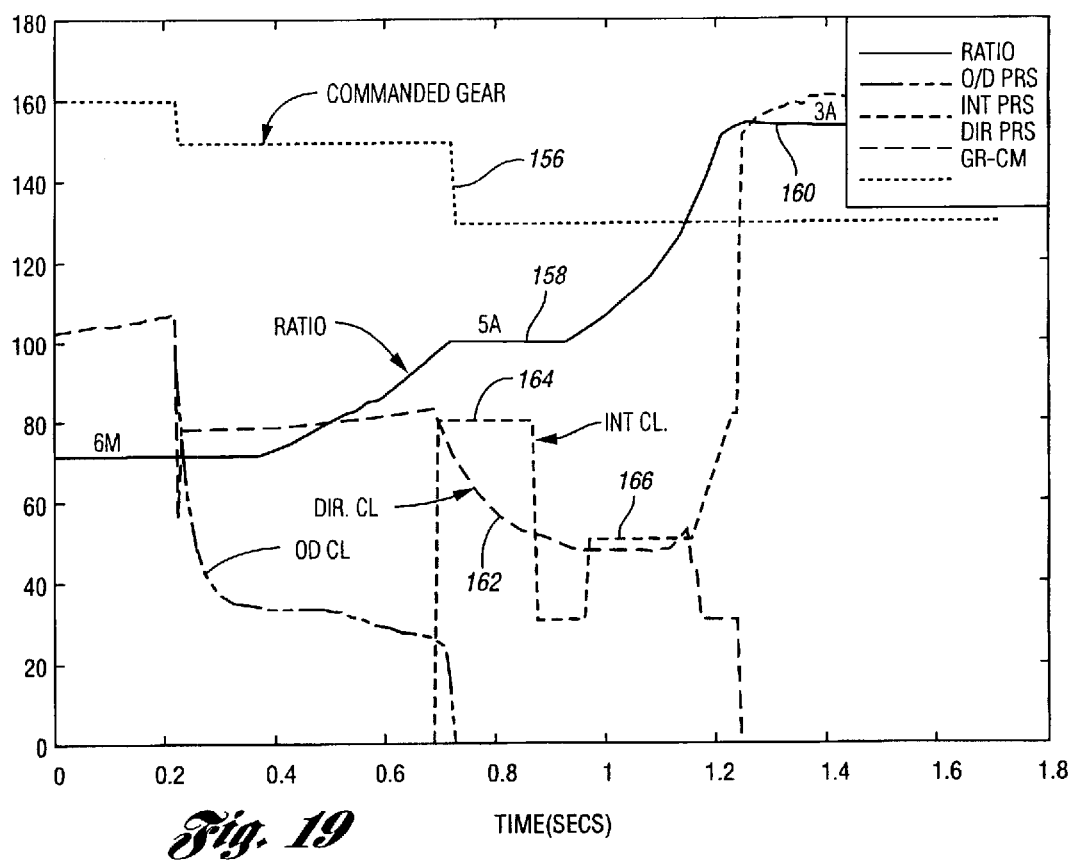
FIG. 19 is a plot of a sequenced 6-5-3 ratio change with no pre-staging.

The plot of FIG. 19 shows a shift without pre-staging for a 6-5-3 sequenced downshift. The gear commands are shown at 156 for each of the gears involved in the shift.

The ratio changes from 6 to 5 until it reaches a plateau at 158 for the fifth gear. That is followed by a ratio change to the third gear plateau, as shown at 160. The direct clutch is applied during operation in fifth gear, but it must be deactivated, as shown at 162, in order to achieve third gear (refer to FIG. 2). The intermediate clutch is applied as the direct clutch is released. The intermediate clutch pressure is first boosted, as shown at 164. The pressure buildup profile for the intermediate clutch is shown at 166.

Figure 20:
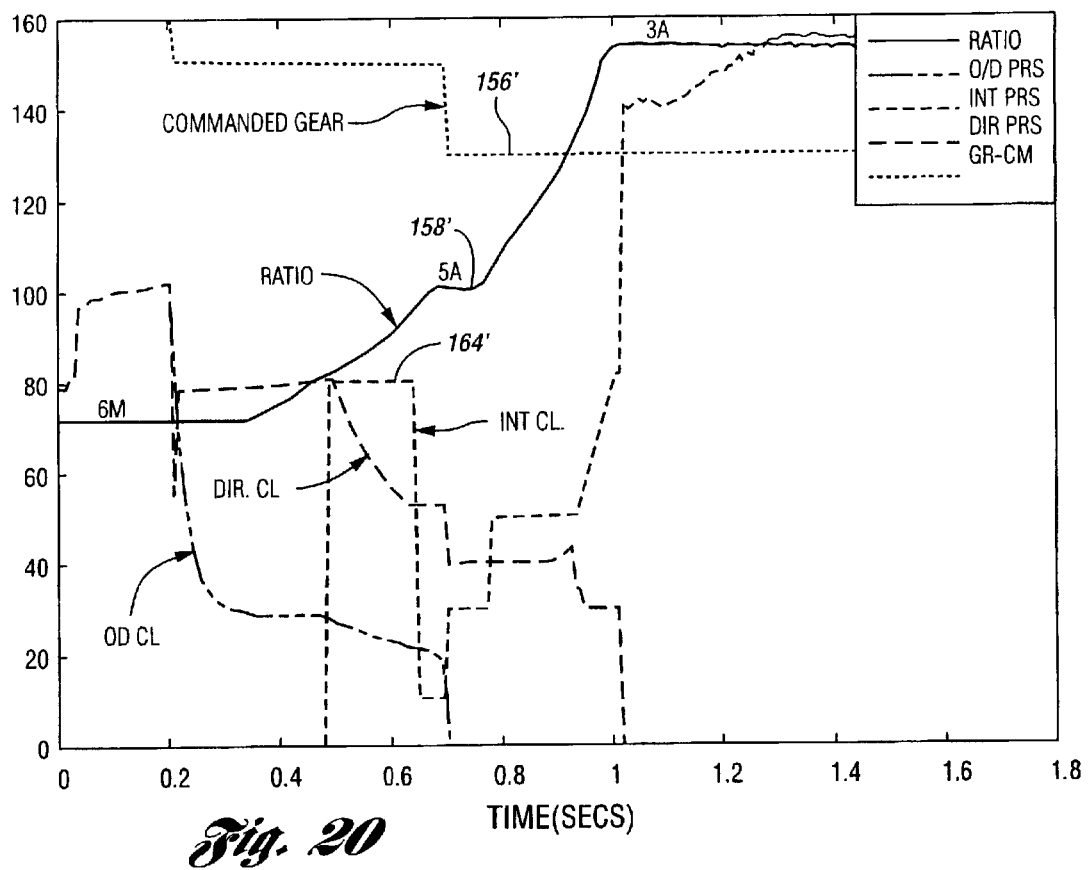
FIG. 20 is a plot corresponding to FIG. 19 wherein a sequenced 6-5-3 ratio change has pre-staging.

In contrast to FIG. 19, pre-staging for the same shift, corresponding to the 6-5-3 shift of FIG. 19, is illustrated in FIG. 20. In this case, the intermediate clutch pressure boost occurs much earlier than in the case of FIG. 19. This early boost is shown at 164' in FIG. 20. The plateau 158' in FIG. 20, which corresponds to the plateau 158 of FIG. 19, is much shorter, thereby making the transition from sixth gear to third gear much smoother and must more seamless than in the case of FIG. 19. The early activation of the pressure profile for the intermediate clutch in FIG. 20 prepares the intermediate clutch for application immediately upon completion of stage 1. When stage 1 is completed, the shift in stage 2 already is pre-prepared, which contributes to a smooth ratio change and an improvement in shift quality.

The algorithms that are included in the memory portions of the pressure control system of the invention allow simultaneous control of any number of friction elements during a shift. The ability of the control system to interrupt a shift and to proceed to any other desired gear during a change-of-mind event improves the driver perception of transmission responsiveness and shift smoothness by monitoring the clutch states. The strategy can switch between pressure profiles during a shift in a controlled matter.

The strategy can be designed to allow change-of-mind events, which will not harm the transmission hardware. The time required for a change-of-mind shift or for a sequence shift is reduced. The control system eliminates "ratio flat spots" during sequence of the shifts. It also reduces the so-called "neutral interval" during power-off manual shifts during which the vehicle engine braking capability is interrupted.

Although an embodiment of the invention has been disclosed, it will be apparent to persons skilled in the art that modifications to that embodiment may be made by persons skilled in the art without departing from the scope of the invention. All such modifications and equivalents thereof are intended to be covered by the following claims.

What is claimed is:

1. A pressure control system for a multiple-ratio, geared, power transmission mechanism for an automotive vehicle powertrain including an engine and a torque output shaft drivably connected to vehicle traction wheels, the transmission mechanism having pressure-operated friction elements for selectively activating multiple torque flow paths through the transmission mechanism and actuators for selectively actuating and deactivating the friction elements;

an electronic controller for developing a desired gear ratio in the transmission mechanism in response to driveline operating variables and driver commanded operating variables, the controller including memory registers for storing transmission control algorithms and a processor unit for executing the control algorithms to establish a desired destination gear ratio in a ratio change sequence in response to the operating variables;

the electronic controller including a first subsystem for processing changes in the desired destination gear by identifying active friction elements, by selecting the gear ratio change sequence, by selecting pressure profiles for each friction element involved in a ratio change, and by timing of the start and completion of each ratio change;

a second subsystem for specifying the pressure control action required to apply or release a friction element during a ratio change and during a friction element engagement, the second subsystem comprising a library of pressure profiles required to complete all ratio changes and engagements; and a third subsystem for storing a collection of pressure calculations and algorithms accessible by the first and second subsystems for calculating an appropriate pressure for each friction element.

2. The pressure control system set forth in claim 1 wherein the first subsystem comprises algorithms for effecting a pressure profile selection from the second subsystem to provide timing and control of pressure for each friction element actuator applied and released during a ratio change, a friction element engagement and a friction element disengagement.

3. The pressure control system set forth in claim 1 wherein the first and second subsystems interface with the third subsystem and each other and use calculations in the third subsystem to monitor the status of a ratio change during a ratio change event and provide appropriate calculations of control functions, including starting torque.

4. The pressure control system set forth in claim 1 wherein each subsystem comprises a separate module that is independently configured whereby the control system is adaptable by calibration for use with a variety of transmission mechanisms with discrete pressure actuated friction elements and for specifying shift identification, pressure profiles, friction element engagements and gear ratio sequencing.

5. A pressure control system for a multiple-ratio, geared, power transmission mechanism for an automotive vehicle powertrain including an engine and a torque output shaft drivably connected to vehicle traction wheels, the transmission mechanism having pressure-operated friction elements for selectively activating multiple torque flow paths through the transmission mechanism and actuators for selectively actuating and deactivating the friction elements;

an electronic controller for developing a desired gear ratio in the transmission mechanism in response to driveline operating variables and driver commanded operating variables, the controller including memory registers for storing transmission control algorithms and a processor unit for executing the control algorithms to establish a desired destination gear ratio in a ratio change sequence in response to the operating variables;

the electronic controller including a first subsystem with algorithms for processing changes in the desired destination gear by identifying active friction elements and by timing of the start and completion of each ratio change;

a second subsystem with algorithms for specifying the pressure control action required to apply or release a friction element during a ratio change and during a friction element engagement, the second subsystem comprising a library of pressure profiles required to complete all ratio changes and engagements;

the first subsystem determining and commanding the ratio change needed to effect the desired destination gear from a current gear state, the needed ratio change being configured from a pre-selectable set of shift events; and a third subsystem storing a collection of pressure calculations and algorithms accessible by the first and second subsystems for calculating an appropriate pressure for each friction element.

6. The pressure control system set forth in claim 5 wherein the first subsystem effects a pressure profile selection from the second subsystem to provide timing and control of pressure for each friction element applied and released during a ratio change, a friction element engagement and a friction element disengagement.

7. The pressure control system set forth in claim 5 wherein the first and second subsystems interface with the third subsystem and use calculations in the third subsystem to monitor the status of a ratio change during a ratio change event and to provide appropriate calculations, including starting torque, to other regions of the control system.

8. The pressure control system set forth in claim 6 wherein each subsystem comprises a separate module that is independently configured whereby the control system is adaptable by calibration for use with multiple transmission mechanisms with discrete pressure actuated friction elements to specify pressure profiles, friction element actuation and gear ratio sequencing.

9. A pressure control system for a multiple-ratio, geared, power transmission mechanism for an automotive vehicle powertrain including an engine and a torque output shaft drivably connected to vehicle traction wheels, the transmission mechanism having pressure-operated friction elements for selectively activating multiple torque flow paths through the transmission mechanism and actuators for selectively actuating and deactivating the friction elements;

an electronic controller for developing a desired gear ratio in the transmission mechanism in response to driveline operating variables and driver commanded operating variables, the controller including memory registers for storing transmission control algorithms and a processor unit for executing the control algorithms to establish a desired destination gear ratio in a ratio change sequence in response to the operating variables;

the electronic controller including a first subsystem with algorithms for processing changes in the desired destination gear by identifying active friction elements and by timing of the start and completion of each ratio change;

a second subsystem with algorithms for specifying the pressure control action required to apply or release a friction element during a ratio change and during a friction element engagement, the second subsystem comprising a library of pressure profiles required to complete all ratio changes and engagements;

the first subsystem determining and commanding the ratio change needed to effect the desired destination gear from a current gear state, the needed ratio change being configured from a pre-selected set of shift patterns;

a third subsystem storing a collection of pressure calculations and algorithms accessible by the first and second subsystems for calculating an appropriate pressure for each friction element;

the first subsystem having buffer portions that receive desired friction element data including shift identification, friction element identification, friction element status and pressure profiles for a current shift in a first buffer stage of a gear shift sequence and buffer portions that receive desired friction element data for a forthcoming shift in a second buffer stage of a gear shift sequence whereby the control system compensates for hydraulic and electronic system delays during ratio changes as friction elements involved in activating the forthcoming gear are prepared for state changes to improve system response.

10. The pressure control system set forth in claim 9 wherein the first subsystem effects a pressure profile selection from the second subsystem to provide timing and control of pressure for each friction element applied and released during a ratio change, a friction element engagement and a friction element disengagement.

11. The pressure control system set forth in claim 9 wherein the first and second subsystems interface with the third subsystem and use calculations in the third subsystem to monitor the status of a ratio change during a ratio change event and provide appropriate calculations, including starting torque, to other regions of the control system.

12. The pressure control system set forth in claim 9 wherein each subsystem comprises a separate module that is independently configured whereby the control system is adaptable by calibration for use with multiple transmission mechanisms with discrete pressure actuated friction elements for specifying pressure profiles, friction element actuation and gear ratio sequencing.

13. The pressure control system set forth in claim 9 wherein the first subsystem and the second subsystem are interfaced whereby pressure profiles for a current gear in the first stage are commanded immediately and the friction elements in the second stage for a forthcoming shift are pre-staged as their pressure profiles are commanded based upon when a current gear event will be completed.

14. The pressure control system set forth in claim 13 wherein the processor for the controller responds to an algorithm in memory to determine instantaneous shift completion estimation of time to complete a ratio change during progression of the ratio change event and to enable control of each friction element involved in the next ratio change event thereby reducing possibility for friction element tie-up in which two reaction elements are actuated simultaneously and enabling a continuous ratio change between the two shift events.

15. The pressure control system set forth in claim 13 wherein the third subsystem includes a library of pressure profiles, each profile comprising control actions establishing an initial pressure at the start of a ratio change with a calculated initial pressure time and a subsequent pressure control routine as the gear ratio during progression of a shift is monitored.

16. The pressure control system set forth in claim 14 wherein the third subsystem comprises a plurality of pressure control routines that are accessed by the first and second subsystems during a ratio change event for calculating appropriate friction element pressures in response to changing operating variables for each of several types of shifts, each pressure profile being characterized by a separate series of control routines for each shift type.

17. The pressure control system set forth in claim 15 wherein the third subsystem comprises a plurality of pressure control routines that are accessed by the first and second subsystems during a ratio change event for calculating appropriate friction element pressures in response to changing operating variables for each of several types of shifts, each pressure profile being characterized by a separate series of control routines for each shift type.

18. A method for controlling a multiple-ratio, geared, power transmission mechanism for an automotive vehicle powertrain including an engine and a torque output shaft drivably connected to vehicle traction wheels, the transmission mechanism having pressure-operated friction elements for selectively activating multiple torque flow paths trough the transmission mechanism and actuators for selectively activating and deactivating the friction elements, the method comprising the steps of:

developing a desired gear ratio in the transmission mechanism in response to driveline operating variables and driver commanded operation variables;

storing transmission control algorithms;

executing the control algorithms to establish a desired destination gear ratio in a ratio change sequence in response to the operating variables;

processing changes in the desired destination gear by identifying active friction elements and by timing the start and completion of each ratio change;

specifying the pressure control action required to apply or release a friction element during a ratio change and during a friction element engagement;

storing a library of pressure profiles required to complete all ratio changes or engagements; and storing a collection of pressure calculations and algorithms accessible for calculating an appropriate pressure for each friction element.

19. The method set forth in claim 18 including the step of selecting a pressure profile to provide timing and control of pressure for each friction element actuator applied and released during a ratio change, a friction element engagement and a friction element disengagement.

20. The method set forth in claim 18 including the step of monitoring the status of a ratio change during a ratio change event and providing appropriate calculations, including starting torque, to other regions of the control system.

21. The method set forth in claim 18 wherein desired friction element data for a current gear is stored in a first buffer stage of a gear shift sequence and storing desired friction element data for a forthcoming gear in a second buffer stage of a gear shift sequence whereby the control system compensates for hydraulic and electronic system delays as friction elements involved in activating the forthcoming gear are prepared for state changes and the system response is improved.

22. The method set forth in claim 21 including the step of providing a library of pressure profiles, each profile comprising a control routine establishing an initial boost pressure at the start of a ratio change with a boost pressure time and a subsequent pressure control routine, and monitoring the gear ratio during progression of a shift.

23. The method set forth in claim 22 wherein each pressure profile is characterized by a series of control routines, accessed by the pressure profiles during a ratio change event to effect a calculation of an appropriate friction element pressure in response to changing operating variables for each of several types of shift, each pressure profile being characterized by a separate series of control routines for each shift type.

24. The method set forth in claim 18 wherein the step of executing the control algorithms includes selecting software control algorithms to allow changes in destination gears during a change-of-mind shift event.

25. The method set forth in claim 24 wherein changes in destination gears include the steps of changing a selection of a pressure profile during a shift sequence for a change-of-mind shift event.

* * * * *